(12) United States Patent
Zhang et al.

(10) Patent No.: US 11,714,734 B1
(45) Date of Patent: Aug. 1, 2023

(54) PLUGGABLE TEST SERVICE FOR HYPER-CONVERGED INFRASTRUCTURE

(71) Applicant: Dell Products L.P., Round Rock, TX (US)

(72) Inventors: Xiaofeng Zhang, Shanghai (CN); Ziqin Jian, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/689,793

(22) Filed: Mar. 8, 2022

(30) Foreign Application Priority Data

Feb. 22, 2022 (CN) .......................... 202210164637.9

(51) Int. Cl.
*G06F 11/00* (2006.01)
*G06F 11/22* (2006.01)

(52) U.S. Cl.
CPC ................................ *G06F 11/2273* (2013.01)

(58) Field of Classification Search
CPC .................................................. G06F 11/2273
USPC ....................................................... 714/1–57
See application file for complete search history.

(56) References Cited

U.S. PATENT DOCUMENTS

| | | | | |
|---|---|---|---|---|
| 10,263,869 | B1* | 4/2019 | Dzierwinski | ........... H04L 43/50 |
| 2007/0006153 | A1* | 1/2007 | Sultan | ................. G06F 11/3688 |
| | | | | 717/124 |
| 2007/0168744 | A1* | 7/2007 | Pal | ...................... G06F 11/3457 |
| | | | | 714/E11.208 |
| 2009/0089623 | A1* | 4/2009 | Neering | ........... G01R 31/31937 |
| | | | | 714/39 |
| 2013/0061209 | A1* | 3/2013 | Lam | ..................... G06F 11/3664 |
| | | | | 717/123 |
| 2015/0100832 | A1* | 4/2015 | Nanjundappa | ...... G06F 11/3664 |
| | | | | 714/38.14 |
| 2015/0127983 | A1* | 5/2015 | Trobough | ........... G06F 11/2733 |
| | | | | 714/30 |
| 2016/0085666 | A1* | 3/2016 | Jordan | .................... H04L 67/01 |
| | | | | 714/38.1 |
| 2019/0383873 | A1* | 12/2019 | Hojabri | .............. G01R 31/3167 |

* cited by examiner

*Primary Examiner* — Sarai E Butler
(74) *Attorney, Agent, or Firm* — Jackson Walker L.L.P.

(57) ABSTRACT

Disclosed methods and systems may perform testing and test management operations in which an information handling resource is provisioned with a programming hook corresponding to an operation associated with the resource. Extended testing operations may be performed when the hook is triggered. These operations may include selecting a particular test service docker from among one or more extended test service dockers. The particular test service docker may then be downloaded and executed. The triggering operation may be associated with a standard pre-check/post-check test framework and, in such cases, the extended testing operations include one or more tests in addition to the pre-check and post-check. Suitable test service dockers may be maintained in a public and/or private cloud. Some embodiments support customer-defined test service dockers, which may initiate as private dockers, but which may be published to the public cloud and linked to the hook.

10 Claims, 2 Drawing Sheets

PLUGGABLE TEST SERVICE FOR HYPER-CONVERGED INFRASTRUCTURE

TECHNICAL FIELD

The present disclosure relates to testing of information handling systems and, more specifically, testing of systems featuring hyper-converged infrastructure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented with a hyper-converged infrastructure (HCI), in which server class hardware is combined with a group of tightly integrated software components to provide virtualized and centrally managed compute, storage, and networking resources. Examples of commercially distributed HCI products include the VxRail family of HCI appliances from Dell Technologies. HCI resources support a wide array of configurations and operational combinations to the customer. Highly configurable resources present testing issues at least in part due to the sheer number of permissible configuration states that a complex resource such as a multi-node cluster implemented with one or more HCI appliance can assume, making it challenging to achieve adequate test coverage.

In addition to potential test coverage issues, highly configurable resources are susceptible to issues wherein an objective pursued via two different sequences of operations does not produce a common result or wherein the same sequence of operations applied to different versions of the underlying hardware produces two different results.

SUMMARY

One or more information handling systems and methods disclosed herein may perform testing and test management operations in which an information handling resource is provisioned with a programming hook, referred to herein as the extended testing hook, corresponding to an operation associated with the resource. Disclosed systems and methods may respond to detecting a triggering of the extended testing hook by performing extended testing operations. In at least some embodiments, the extended testing operations include selecting a particular test service docker from among one or more extended test service dockers associated with the extended testing hook. The particular test service docker may then be downloaded and executed, after which a test report corresponding to the particular test service docker is generated.

The extended testing hook may be triggered each time the corresponding operation is performed. In other cases, triggering the extended testing hook may require one or more additional prerequisites or conditions. The operation may be associated with a standard test configuration or framework in which a pre-check test is executed before the operation is performed and a post-check test is executed after the operation is performed. In such embodiments, the extended testing operations may include performing one or more tests in addition to the pre-check and post-check tests. The test service docker may be maintained in a public cloud or a private cloud. In some embodiments, newly developed test service dockers are stored in the cloud and, in such cases, a decision is made between executing the local test service docker or the cloud test service. Some embodiments permit and support customer-defined test service dockers. These customer-defined test service dockers may be initially stored by default as private test service dockers within a local test development platform. Subject to a request and approval process with a customer's IT administrator, a customer-defined test service docker might be published and uploaded to cloud based resources for use without other clusters, other customers, etc. In addition, an IT administrator may determine that the test is suitable for inclusion within existing extended test services. In such cases, the administrator may link the customer-defined test service docker to the extended testing hook, in which case, the customer-defined test service docker may be invoked automatically when the extended testing hook is next triggered.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
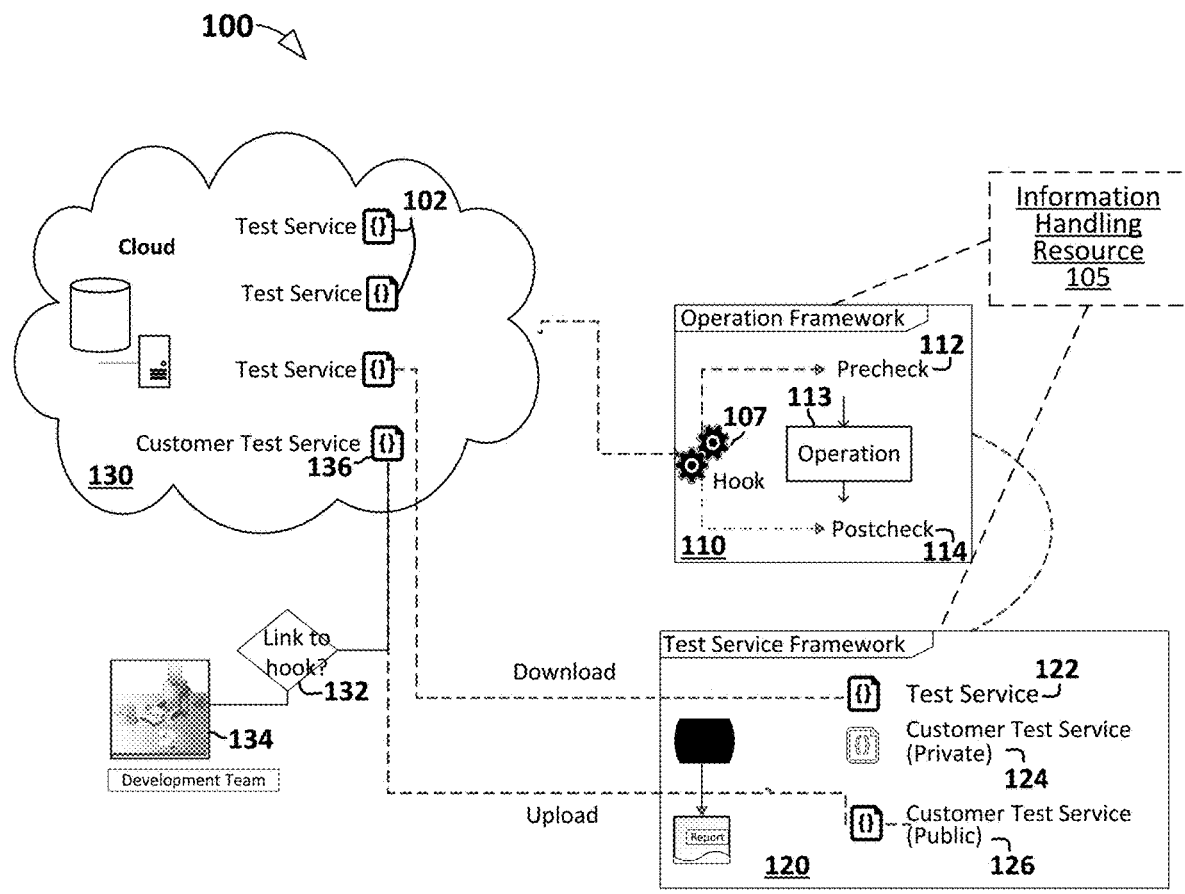
FIG. 1 illustrates an exemplary platform for implementing containerized test services.
Figure 2:
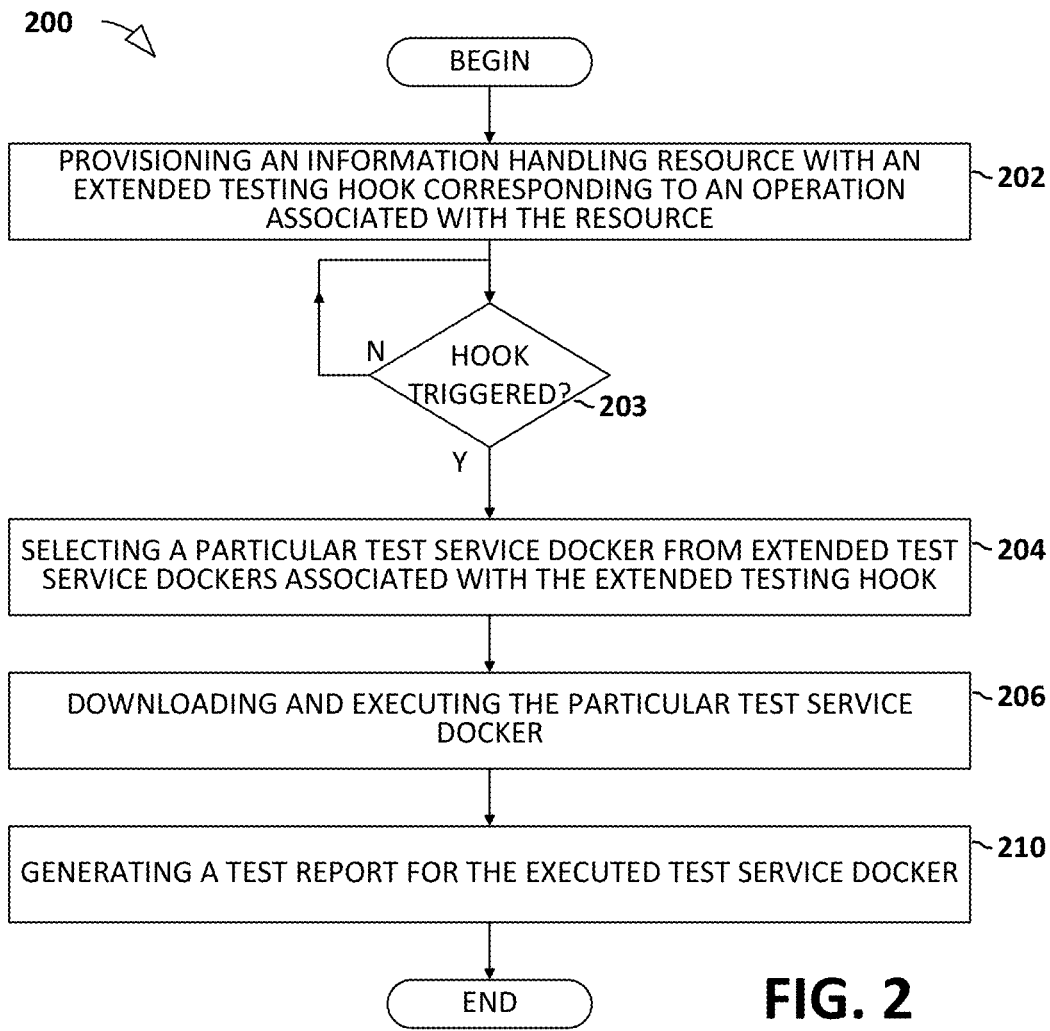
FIG. 2 illustrates a flow diagram for employing test service dockers.
Figure 3:
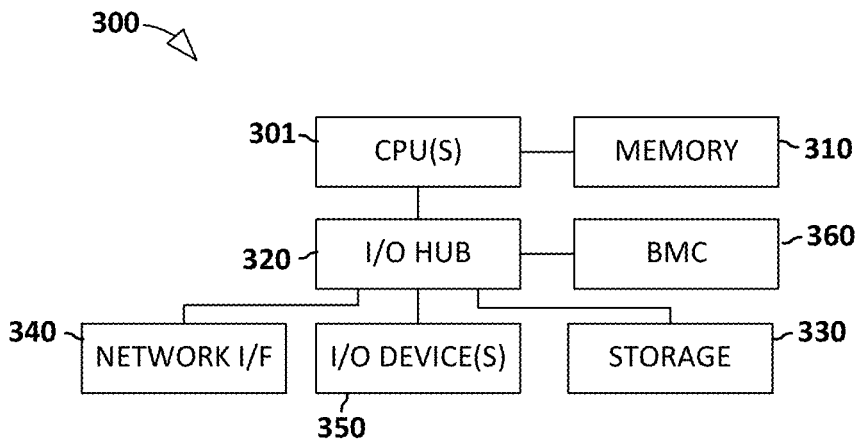
FIG. 3 illustrates selected elements of an information handling system suitable for use in conjunction with methods and systems of FIG. 1 and FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a containerized test service environment 100 suitable for implementing containerized, customer-definable test services, sometimes referred to herein as test service dockers. The containerized test service environment 100 illustrated in FIG. 1 provides a container-based mechanism to deploy standard test services shipped with or within an information handling system resource or product. The disclosed containerized test service environment implements a distributed library of test service dockers including public test service dockers residing in test service framework 120, which can be uploaded to the cloud, as well as test service dockers residing in the cloud, which can be downloaded to operation framework 110. These public test service dockers can be downloaded to the information handling resource or uploaded to the cloud.

Disclosed test services dockers enable development teams to obtain test data statistics rapidly and to identify commonly used customer use and/or test scenarios. In some embodiments, the disclosed containerized test service environment 100 expands upon a test development framework that may be in place for converting test scenarios into services. Containerized test service environment 100 can extend this functionality by implementing containerized test services.

The containerized test service environment 100 illustrated in FIG. 1, referred to hereinafter simply as test environment 100 for the sake of clarity and brevity, includes an operational framework 110, a test service framework 120, and a public cloud platform 130. The operational framework 110 as illustrated in FIG. 1 encompasses an operation 113, such as an operation performed by a particular information handling resource 105, together with a pre-check 112 performed before operation 113 is executed and a post-check 114 performed after operation 113 is executed.

The information handling resource 105 may be provisioned with a programming hook, referred to herein simply as hook 107. Hook 107 may, in at least some embodiments, define states or events that trigger extended testing as disclosed herein. If hook 107 is triggered, a test service docker 102 in cloud resources 130 or a test service docker 122 in test service framework 120 may be downloaded or otherwise provided to operation framework 110 for execution. When extended testing is triggered, the illustrated test environment 100 may compare test service dockers 102 within cloud resource 130 versus test service dockers 122 on the local test framework 120. From these, the illustrated test environment 100 selects a particular test service docker to download and execute.

The illustrated test environment 100 may be leveraged to enable customers to define customized test services with new test service dockers or by modifying existing test service dockers. Typically, by default, new and modified customer-specified test services are maintained in a private/local environment. Such a private, local, customer-defined test service is illustrated in FIG. 1 by reference numeral 124. The private customer test service 124 of FIG. 1 may, in some cases, be converted to a public customer-defined test service such as the test service 126 illustrated in FIG. 1. This may occur, for example, when it is subsequently deemed appropriate to share test service docker 126 between different clusters and/or customers.

After converting private test service docker 124 to public test service docker 126, the public test service docker 126 can be uploaded to the cloud resource 130. An exemplary customer-defined test service 136 is depicted within cloud resource 130.

Although customer-defined test service 136 is depicted within cloud platform 130 and may be publically accessible, it may not be invoked automatically, as part of an extended testing service, unless and until the docker is linked to the extended testing hook 107. Linking a customer specified test service docker to an extended testing hook 107 will incorporate the customer-specified test service docker into the automated extended testing initiated whenever hook 107 is triggered. To link a customer specified test service docker to hook 107 a request 132 may be sent to a development team 134 to determine whether the public test service docker should be identified as a common service. If development team 134 determines that the applicable test service docker is suitable for use as a common service the test service docker may be linked to hook 107, where it may be maintained by development team 134 and shared among all customers accordingly.

Referring now to FIG. 2, a method 200 for implementing containerized test services is depicted in flow diagram format. The illustrated method begins by provisioning (block 202) an information handling resource with an extended testing hook, wherein the hook corresponds to an operation associated with the resource. For example, the resource may be an HCI appliance or a node within an HCI appliance and the operation that triggers the hook may be a reconfiguration operation. The hook may represent code that is executed when the hook is triggered. In this example, an extended testing docker may be downloaded when a reconfiguration of the applicable resource is performed. Returning to FIG. 2, responsive to detecting (block 203) a triggering of the extended testing hook, extended testing operations are performed in blocks 204-210. A particular test service docker is selected (block 204) from among one or more extended test service dockers associated with the extended testing hook. The selected test service docker is then downloaded and executed (block 206) and a test report for the executed docker is executed (block 210).

Referring now to FIG. 3, any one or more of the elements illustrated in FIG. 1 and FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
provisioning an information handling resource with an extended testing hook corresponding to an operation associated with the information handling resource; and
responsive to detecting a triggering of the extended testing hook, performing extended testing operations, wherein the extended testing operations include:
selecting a particular test service docker from among one or more extended test service dockers associated with the extended testing hook;
downloading and executing the particular test service docker; and
generating a test report corresponding to the particular test service docker, wherein selecting the particular test service docker comprises selecting a customer-defined test service docker and wherein the extended testing operations further include linking the customer-defined test service docker to the extended testing hook.

2. The method of claim 1, wherein detecting a triggering of the extended testing hook comprises detecting a performing of the operation.

3. The method of claim 2, wherein performing the operation includes performing a pre-check associated with the operation before performing the operation and performing a post-check associated with the operation after performing the operation, wherein the extended testing operations include performing one or more tests in addition to the pre-check and post check.

4. The method of claim 1, wherein selecting the particular test service docker includes selecting between a cloud-resident test service docker and a local test service docker.

5. The method of claim 1, further comprising:
uploading the customer-defined test service docker to a cloud library of test service dockers.

6. An information handling system, comprising:
a central processing unit (CPU); and
a computer readable memory, accessible to the CPU, including processor-executable instructions that, when executed by the CPU, cause the system to perform test management operations, wherein the test management operations include:
provisioning an information handling resource with an extended testing hook corresponding to an operation associated with the information handling resource; and
responsive to detecting a triggering of the extended testing hook, performing extended testing operations, wherein the extended testing operations include:
selecting a particular test service docker from among one or more extended test service dockers associated with the extended testing hook;
downloading and executing the particular test service docker; and
generating a test report corresponding to the particular test service docker, wherein selecting the particular test service docker comprises selecting a customer-defined test service docker and wherein the extended testing operations further include linking the customer-defined test service docker to the extended testing hook.

7. The information handling system of claim 6, wherein detecting a triggering of the extended testing hook comprises detecting a performing of the operation.

8. The information handling system of claim 7, wherein performing the operation includes performing a pre-check associated with the operation before performing the operation and performing a post-check associated with the operation after performing the operation, wherein the extended testing operations include performing one or more tests in addition to the pre-check and post check.

9. The information handling system of claim 6, wherein selecting the particular test service docker includes selecting between a cloud-resident test service docker and a local test service docker.

10. The information handling system of claim 6, wherein the extended test operations include:
uploading the customer-defined test service docker to a cloud library of test service dockers.

* * * * *